(12) United States Patent
Crozat et al.

(10) Patent No.: US 10,315,774 B2
(45) Date of Patent: Jun. 11, 2019

(54) AIRCRAFT SEAT THAT IS TOLERANT TO FLOOR DEFORMATION

(71) Applicant: AIRBUS HELICOPTERS, Marignane (FR)

(72) Inventors: Pierre Crozat, Senas (FR);
Jean-Francois Joffre, Martigues (FR);
Marcin Stawiak, Lodz (PL)

(73) Assignee: AIRBUS HELICOPTERS, Marignane (FR)

( * ) Notice: Subject to any disclaimer, the term of this patent is extended or adjusted under 35 U.S.C. 154(b) by 176 days.

(21) Appl. No.: 15/441,328

(22) Filed: Feb. 24, 2017

(65) Prior Publication Data
US 2017/0253337 A1    Sep. 7, 2017

(30) Foreign Application Priority Data
Mar. 1, 2016 (FR) .................................... 16 00346

(51) Int. Cl.
*B60N 2/42*    (2006.01)
*B64D 11/06*    (2006.01)
*B60N 2/427*    (2006.01)

(52) U.S. Cl.
CPC ........ *B64D 11/0648* (2014.12); *B60N 2/4242* (2013.01); *B60N 2/42709* (2013.01);
(Continued)

(58) Field of Classification Search
CPC ............ B64D 11/0619; B64D 11/0648; B64D 11/0696; B64D 25/04; B64D 11/0639;
(Continued)

(56) References Cited

U.S. PATENT DOCUMENTS 3,059,966 A * 10/1962 Spielman ............. B60N 2/7082
188/374
3,582,133 A    6/1971 Delavenne
(Continued)

FOREIGN PATENT DOCUMENTS

EP    0679573 A2    11/1995
EP    0679573 A3    11/1995
(Continued)

OTHER PUBLICATIONS

French Search Report for French Application No. FR 1600346, Completed by the French Patent Office dated Nov. 2, 2016, 5 Pages.

*Primary Examiner* — Chi Q Nguyen
(74) *Attorney, Agent, or Firm* — Brooks Kushman P.C.

(57) ABSTRACT

A vehicle seat comprising a stand and a bucket having a seat pan and a seat back. Said stand serves to fasten said bucket to a floor of said vehicle and to absorb deformation of said floor while limiting the mechanical stresses that are transmitted to said bucket. Said pan is connected to said bucket via a revolute joint for pivoting about a transverse direction and by energy absorber devices. The stand has two first legs forming a fork and connecting the front of said bucket to said floor via ball joint connections. The bucket is connected to said floor at the rear of the seat via two ball joint connections. The stand is thus connected to said bucket via three points and to said floor via four points making it possible to avoid twisting said bucket as a result of deformation of said floor.

23 Claims, 7 Drawing Sheets

(52) U.S. Cl.
CPC ...... B60N 2/42736 (2013.01); B64D 11/0619 (2014.12); B64D 11/0696 (2013.01); Y02T 50/46 (2013.01)

(58) Field of Classification Search
CPC .............. B64D 11/0689; B60N 2/4242; B60N 2/42736; B60N 2/42709; B60N 2/4207; B60N 2/427
USPC ......... 297/216.1, 216.17, 216.14; 244/122 R
See application file for complete search history.

(56) References Cited

U.S. PATENT DOCUMENTS

| | | | |
|---|---|---|---|
| 4,128,217 A | 12/1978 | Mazelsky | |
| 5,722,617 A | 3/1998 | Cecinas | |
| 6,237,889 B1 * | 5/2001 | Bischoff | B60N 2/0228 180/902 |
| 7,628,397 B2 * | 12/2009 | Ogasawara | B65H 29/14 271/220 |
| 8,087,723 B2 | 1/2012 | Honnorat et al. | |
| 8,562,075 B2 | 10/2013 | Honnorat et al. | |
| 9,604,725 B2 * | 3/2017 | Cecinas | B60N 2/20 |
| 9,840,310 B2 * | 12/2017 | Smith | B63B 29/04 |
| 2002/0033622 A1 * | 3/2002 | Jarnail | B60N 2/4221 297/216.2 |
| 2011/0079681 A1 * | 4/2011 | Honnorat | B64D 11/0689 244/122 R |
| 2013/0228652 A1 | 9/2013 | Joffre | |
| 2015/0035340 A1 | 2/2015 | Lussan | |
| 2016/0257381 A1 * | 9/2016 | Smith | B63B 29/04 |

FOREIGN PATENT DOCUMENTS

| | | |
|---|---|---|
| FR | 1543275 | 10/1968 |
| FR | 2495101 | 6/1982 |
| FR | 2735096 | 12/1996 |
| FR | 2930520 | 10/2009 |
| FR | 2930613 | 10/2009 |
| FR | 3001418 | 8/2014 |
| GB | 2313214 | 11/1997 |
| WO | 2008073035 | 6/2008 |
| WO | 2013076255 | 5/2013 |

* cited by examiner

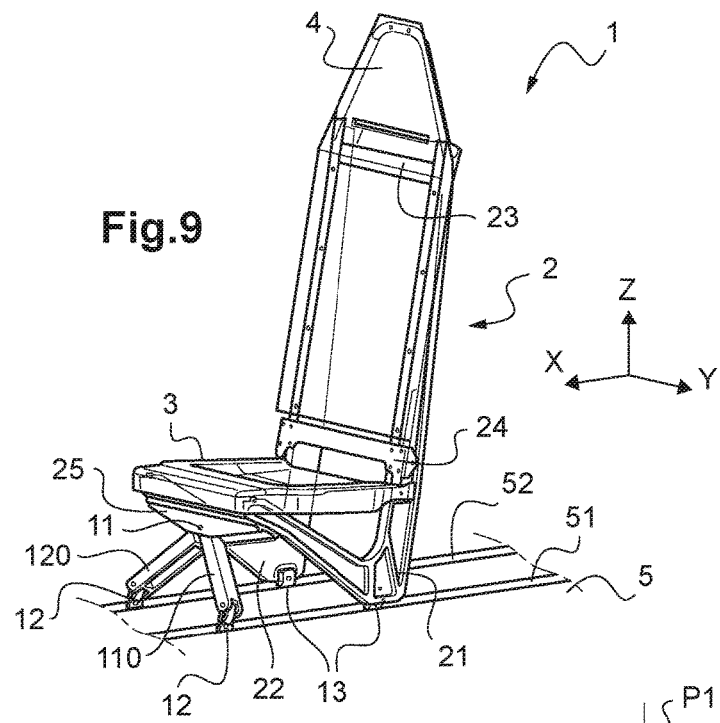
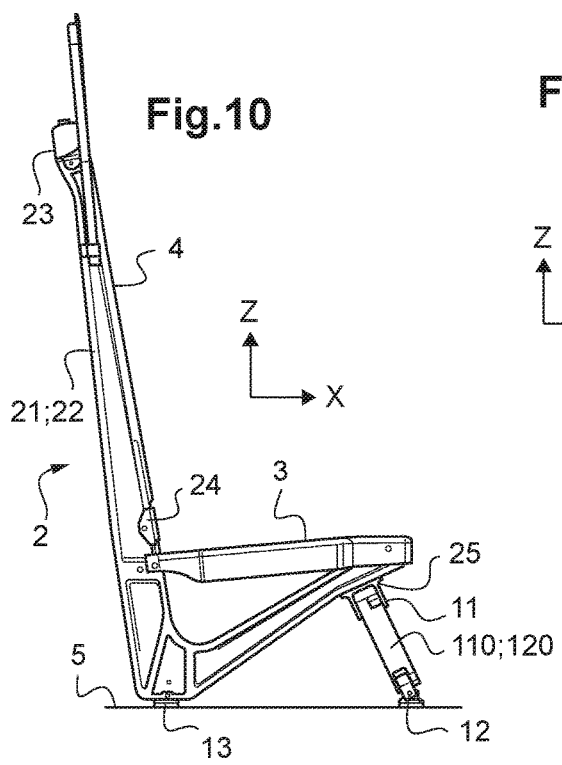
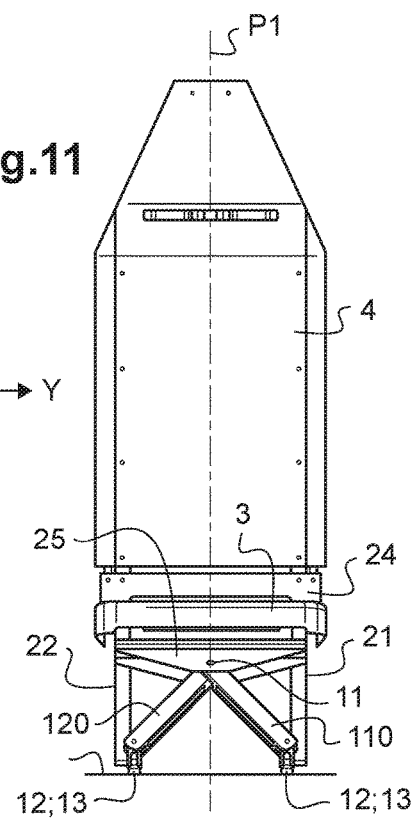

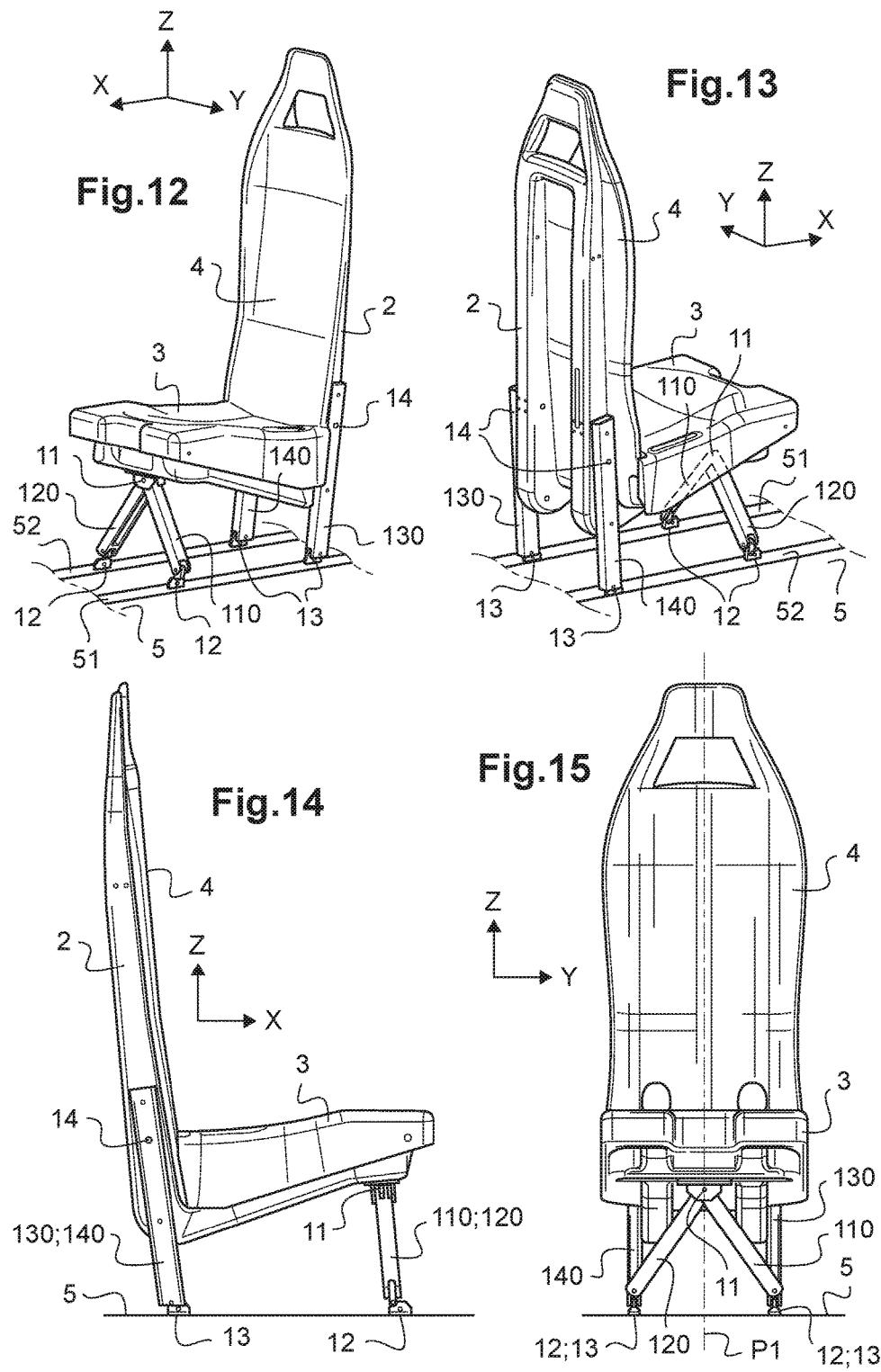

AIRCRAFT SEAT THAT IS TOLERANT TO FLOOR DEFORMATION

CROSS-REFERENCE TO RELATED APPLICATIONS

This application claims priority to French patent application No. FR 16 00346 filed on Mar. 1, 2016, the disclosure of which is incorporated in its entirety by reference herein.

BACKGROUND OF THE INVENTION

Field of the Invention

The present invention lies in the field of vehicle seats, and in particular aircraft seats. The present invention provides an aircraft seat having a stand that is capable of absorbing deformation of the floor of the aircraft, in particular in the event of a violent landing or indeed of a crash.

Description of Related Art

Any seat in an aircraft must provide protection to the passenger occupying the seat, in particular in the event of a violent landing or indeed of a crash. In particular, the seat must absorb violent impacts and/or strong vertical deceleration to which the aircraft might be subjected.

For this purpose, aircraft seats incorporate passenger protection means commonly constituted firstly by the structure of the seat and secondly by one or more energy absorber devices. An energy absorber device serves to dissipate some or all of the kinetic energy that is stored in the passenger of the seat when the seat is subjected to violent impacts and/or strong deceleration, in particular in the event of a crash. Such an energy absorber device serves to limit bodily injury to the passenger of the seat, in particular compression of the spinal column.

In a common embodiment, a seat comprises a stand, a bucket including both a seat pan and a seat back, and one or more energy absorber devices. The stand is anchored to the floor of the aircraft via a plurality of fastening points and it supports the bucket, which may possibly slide relative to the stand. One or more energy absorber devices connect the bucket to the stand. Starting from a force corresponding to a certain level of deceleration, the bucket is thus capable of sliding relative to the stand in order to dissipate part of the energy. By way of example, the stand may be made up of two L-shaped legs to which the bucket is fastened.

An energy absorber device generally comprises deformable support means, such that the bucket is held firmly in a situation of normal use. In the event of a crash, the strong deceleration to which the aircraft is subjected deforms the support means, thereby leading to downwardly directed sliding of the bucket relative to the stand. As a result, at least a portion of the energy to which the passenger is subjected during a crash is dissipated by deforming the support means. Deformation of the support means is referred to as "deployment" of the energy absorber device. By way of example, an energy absorber device is described in Document FR 2 930 613, and Document FR 2 930 520, describing an aircraft seat fitted with such a device.

Furthermore, in order to qualify as a seat for aviation, the applicable regulations and standards require static pre-stress to be introduced into the structure of the seat during validation testing in order to simulate the effect on the seat of deformation of the floor as occurs during a crash. The seat must be structured to absorb the kinetic energy of the passenger in compliance with the requirements of aviation regulations, while accommodating said deformation of the floor and without separating from the floor.

The application of floor deformation to the stand of the seat leads to the stand being deformed, with this being transmitted to the mechanical connections between the stand and the bucket, and consequently to the bucket. The bucket, and consequently both the pan and the back are subjected in particular to twisting, and that twisting may be considerable. Such stressing of the stand and twisting imparted to the bucket and its mechanical connections with the stand lead to large effects on the seat and its components.

Firstly, the application of such deformation from the floor to the stand causes static mechanical stresses to appear in the components of the seat, and in particular in the fastenings between the stand and the floor, in the means for connecting and guiding the bucket relative to the stand, and finally in the bucket itself.

In particular, these static mechanical stresses that appear as a result of the floor deforming can lead to a malfunction of the energy absorber device, such as partial deployment with limited energy dissipation, or indeed complete blocking of the energy absorber device. Consequently, in the event of an impact, the energy absorber device no longer performs its function in full and does not absorb the expected amount of energy.

Furthermore, such deformation of the floor can also lead to friction appearing in the means for guiding the bucket relative to the stand. This friction is an internal friction phenomenon within the guide means, which friction is difficult to control and leads to jerky catching and/or sliding phenomena between the sliding elements constituting such guide means, or indeed to them becoming totally jammed. Such friction can then lead to random operation of the energy absorber devices, thereby degrading the quality with which energy is absorbed during a crash.

Likewise, hammering or swarf-generating phenomena can also appear in the guide means and can cause them to malfunction, and consequently can lead to random operation of the energy absorber devices.

In particular, sudden variations in energy absorption can occur, giving rise to peaks of force in a passenger's spinal column, which may be fatal.

Accommodating such deformation of the floor thus requires the components of the seat to be overdimensioned and requires the connection and guide means to be complex in order to ensure that the seat operates correctly during a crash. This thus involves the guide means and the sliding elements being reinforced, and being designed in particular so as to limit the appearance of friction.

Furthermore, as a result of the bucket twisting, the pan and the back present contact surfaces with the passenger that become deformed, having the consequence of the passenger sliding and/or being positioned asymmetrically during a crash. Such positioning of the passenger leads to random movements of the passenger's body that can generate additional forces on the limbs, in particular on joints, leading to additional bodily injuries.

Furthermore, Document FR 2 495 101 describes an aircraft seat comprising a bucket having a pan and a back, a support connecting the bucket to the floor, a practically undeformable box secured to the bucket, and a plurality of energy absorber devices. That seat makes it possible to dissociate the energy absorber devices vertically and horizontally so that they are independent of the state of twisting of the floor. Nevertheless, the support does not prevent the stresses that result from the floor twisting being transmitted to the bucket and to its components.

Document WO 2008/073035 describes a vehicle seat having a triangular pan and a back to which the pan is connected by revolute joints. The front of the seat is connected via a revolute joint to a front support fastened to the floor of the vehicle, while the back is connected directly to the floor by revolute joints. The pan and the back are tubular structures. The seat is thus fastened to the floor at three points via three revolute joints.

Document FR 2 735 096 describes a swivel seat for a vehicle, in particular an aircraft. The swivel seat comprises a base that is fastened to the floor of the vehicle and provided with a top turntable, and also a pan that is fastened to the top turntable via declutchable connections allowing the pan to move parallel to the top turntable. The base also includes at least two components connected to the top turntable and hinged about orthogonal hinge axes that are parallel to the top turntable. The base thus makes it possible to avoid twisting of the floor that exceeds a certain limit leading to deformation of the pan, or indeed to the pan escaping from the base.

Document U.S. Pat. No. 3,582,133 describes a vehicle seat, in particular for a car. That seat is fastened to the floor at three points via three revolute joints and it includes at least one energy absorber device. Each energy absorber device is arranged between the seat and one of the fastening points with the floor. Furthermore, the floor may include a deformable zone at at least one of the fastening points in order to dissipate a portion of the energy in the event of an impact.

Furthermore, Document GB 2 313 214 describes a vehicle seat provided with an active suspension device for limiting movements of the seat during movements of the vehicle. The seat includes an understructure formed by actuators and connected via ball joint connections firstly to a support that is secured to the seat, and secondly to the floor of the vehicle.

Furthermore, Document U.S. Pat. No. 4,128,217 describes a support for fastening a seat on the floor of an aircraft while serving to isolate the seat from deformation of the floor in the event of the aircraft crashing.

Finally, the technological background of the invention includes Documents US 2013/228652 and EP 0 679 573, which describe energy absorber seats for aircraft, and also Document WO 2013/076255, which describes an extensible connection element for fastening a seat to the floor of a vehicle.

Furthermore, certain additional requirements need to be taken into account when designing and selecting a seat for a vehicle, and in particular for an aircraft.

Firstly, the space occupied by the seat needs to be minimized, e.g. in order to make it easier to install in the cabin of the vehicle, in particular in order to optimize the number of seats that can be installed in the cabin. Furthermore, the weight of the seat must also be minimized in order to limit its effect on the weight of the vehicle. Finally, the structure of the seat must be as simple as possible in order to limit its weight and the cost of fabricating the seat.

BRIEF SUMMARY OF THE INVENTION

An object of the present invention is thus to provide a seat for a vehicle, such as an aircraft, that serves to satisfy the requirements of aviation regulations, while avoiding the above-mentioned limitations. The present invention provides a vehicle seat having a stand capable of absorbing deformation of the floor of the aircraft in the event of strong deceleration, thereby limiting the amount of mechanical stress resulting from such deformation of the floor that becomes transmitted to the bucket of the seat, so as to avoid generating significant twisting of the bucket.

According to the invention, a vehicle seat comprises a bucket and a stand, the stand serving to fasten the bucket to a floor of the vehicle. The bucket includes a seat pan and a seat back suitable for receiving a passenger.

The device of the invention is remarkable in that the stand has two first legs and mechanical connections, each first leg being provided with two ends and being mechanically connected firstly via a first one of its ends to the bucket via a first mechanical connection, and secondly being designed to be mechanically connected via the other one of its ends to the floor via a second mechanical connection each having at least two degrees of freedom to move in rotation, two first directions respectively interconnecting the two ends of each of the first legs not being parallel to each other, two third mechanical connections provided respectively with at least two degrees of freedom to move in rotation being designed to connect the bucket mechanically to the floor so that the seat is suitable for absorbing deformation of the floor, while limiting the mechanical stresses that are transmitted to the bucket, so as to avoid twisting the seat.

By way of example, the vehicle is an aircraft, such as an airplane or a rotary wing aircraft, and it has a cabin that includes at least one floor.

The vehicle floor is adapted to receive one or more seats. By way of example, the floor may have fixed anchor points to which the stand of each seat is fastened.

The floor may also have rails in which the stand is fastened. Such rails thus enable each seat to slide independently, e.g. for the purpose of adapting the space between seats and/or easily modifying the arrangement of the seats.

The rails are generally arranged longitudinally in the vehicle, i.e. along a first direction extending from the rear towards the front of the vehicle. Nevertheless, such rails could equally well extend transversely in the vehicle, i.e. from one side of the vehicle to the other in a second direction, e.g. perpendicular to the first direction.

Furthermore, three preferred directions (X, Y, Z) forming a rectangular reference frame are associated with the seat. A longitudinal direction X extends from the rear of the seat towards the front of the seat, i.e. from the back towards the nose of the pan, and a transverse direction Y extends from one flank of the pan towards the other flank of the pan perpendicularly to the longitudinal direction X. An elevation direction Z extends upwards, i.e. from the floor towards the pan. The back is connected to the pan about a direction that is substantially parallel to the transverse direction Y.

Generally, a seat is thus installed on the forward axis of the vehicle, with the longitudinal and transverse directions X and Y of the seat corresponding to the longitudinal and transverse directions of the vehicle. The seat may be installed in the forward direction of the vehicle, i.e. "facing forwards", or it may be installed in the direction opposite to the forward direction of the vehicle, i.e. "facing backwards". Nevertheless, any other installation of the in the vehicle is also possible.

During a major deceleration of the vehicle, e.g. as a result of a violent impact or an accident, the floor of the vehicle deforms. Deformation of the floor moves one or more of the points fastening the seat to the floor, possibly with the rails themselves moving. Consequently, one or more legs of the stand may move relative to one another in order to follow the deformation of the floor.

Advantageously, the available degrees of freedom to move at the mechanical connections of the stand between the bucket and the floor provide capacity for the bucket to move relative to the stand and the floor when the floor deforms. Consequently, the bucket can move relative to the stand and to the floor without being subjected to high levels of mechanical stress resulting from deformation of the floor. Consequently, the bucket is not subjected to twisting.

In a first embodiment of the seat of the invention, the bucket is connected to the floor of the vehicle firstly by the first legs via the first and second mechanical connections, and secondly solely via the third mechanical connections forming part of the stand of the seat.

In a second embodiment of the seat of the invention, the bucket is connected to the floor firstly by the first legs via the first and second mechanical connections, and secondly via third and fourth mechanical connections and second legs.

Specifically, in the second embodiment, the stand also has second legs and fourth mechanical connections, a fourth mechanical connection and a second leg being inserted between the bucket and each third mechanical connection. The bucket is thus connected to each third mechanical connection via a fourth mechanical connection and a second leg, each third mechanical connection connecting a second leg to the floor and each fourth mechanical connection connecting a second leg to the bucket.

Each fourth mechanical connection is preferably provided with at least one degree of freedom to move, and in particular with one or more degrees of freedom to move in rotation only. For example, each fourth mechanical connection is provided with a single degree of freedom to move in rotation and is formed by a revolute joint. Each fourth mechanical connection may also include three degrees of freedom to move in rotation and it may be formed by a ball joint connection.

Furthermore, each fourth mechanical connection may include at least one blocking element constituting an abutment that limits the movement in rotation of a second leg. Likewise, a blocking element may incorporate a friction element generating friction within the fourth mechanical connection and preventing the fourth mechanical connection from moving freely. Each fourth mechanical connection is thus movable only when a mechanical force is applied, e.g. when the seat is subjected to strong deceleration.

Nevertheless, each fourth mechanical connection may also have no degree of freedom to move and may be formed by a permanent connection. This second embodiment is thus very close to the first embodiment, each second leg possibly being considered as forming part of the bucket.

The first and second embodiments may be provided in several variants. Variants one to five relate to the first and second mechanical connections and may be combined with variants six to nine, which relate to the third mechanical connections.

In a first variant, each first mechanical connection and each second mechanical connection is provided with three degrees of freedom to move in rotation and is formed by a respective ball joint connection.

In a second variant, each first mechanical connection is provided with one degree of freedom to move in rotation about a first axis and each second mechanical connection is provided with two degrees of freedom to move in rotation about third and fourth axes that are not parallel to each other, the first axis being parallel to one of the third and fourth axes.

In a third variant, each first mechanical connection is provided with two degrees of freedom to move in rotation about first and second axes that are not parallel to each other, and each second mechanical connection is provided with two degrees of freedom to move in rotation about third and fourth axes that are not parallel to each other, one of the first and second axes being non-parallel to the third and fourth axes, the other of the first and second axes being parallel to one of the third and fourth axes.

In a fourth variant, each first mechanical connection is provided with two degrees of freedom to move in rotation about first and second axes that are not parallel to each other, and each second mechanical connection is provided with two degrees of freedom to move in rotation about third and fourth axes that are not parallel to each other, the first and second axes being parallel respectively to the third and fourth axes.

Each first mechanical connection may thus be formed by two revolute joints, and each second mechanical connection may be formed by two revolute joints.

Furthermore, for these third and fourth variants, each first mechanical connection may be provided with a third degree of freedom to move in rotation.

In a fifth variant, each first mechanical connection is provided with a degree of freedom to move in rotation about a first axis, and each second mechanical connection is provided with at least three degrees of freedom, including two degrees to move in rotation about third and fourth axes that are not parallel to each other, the first axis being parallel to one of the third and fourth axes.

Each second mechanical connection may typically include two or three degrees of freedom to move in rotation and one degree of freedom to move in translation e.g. along an axis perpendicular to the first axis.

By way of example, each first mechanical connection is formed by a revolute joint about the first axis, and each second mechanical connection is formed by a cylindrical joint on the third axis and a revolute joint about the fourth axis.

Furthermore, this degree of freedom to move in translation may be transferred from the second connection to the first connection without significantly modifying the behavior of the seat in the event of the floor of the aircraft deforming.

Preferably, for these variants, the first and second axes are parallel to a first plane and the third and fourth axes are parallel to a second plane.

By way of example, for the third variant, the first and third axes are parallel to the longitudinal direction X, the fourth axis is parallel to the transverse direction Y, and the second axis, if any, is parallel to the vertical direction Z. The first plane is thus formed by the longitudinal and vertical directions X and Z, while the second plane is formed by the longitudinal and transverse directions X and Y.

For the fourth variant, the first and third axes are parallel to the longitudinal direction X, while the second and fourth axes are parallel to the transverse direction Y. The first plane and the second plane are thus parallel and formed by the longitudinal and transverse directions X and Y.

In a sixth variant, each third mechanical connection is provided with three degrees of freedom to move in rotation, and is formed by a ball joint connection.

In a seventh variant, each third mechanical connection is provided with two degrees of freedom to move in rotation about fifth and sixth axes that are not parallel to each other, and is formed by two revolute joints. These fifth and sixth axes are preferably parallel to a third plane.

Furthermore, each second mechanical connection is provided with two degrees of freedom to move in rotation about third and fourth axes, and these fifth and sixth axes are preferably parallel respectively to the third and fourth axes.

In an eighth variant, each third mechanical connection is provided with three degrees of freedom comprising two degrees of freedom to move in rotation about the fifth and sixth axes, and a degree of freedom to move in translation along one of these two axes, and is formed by a cylindrical joint and by a revolute joint.

In a ninth variant, each third mechanical connection is provided with four degrees of freedom, comprising two degrees of freedom to move in rotation and two degrees of freedom to move in translation on fifth and sixth axes, and is formed by two cylindrical joints.

For the first embodiment of a seat of the invention, each third mechanical connection in any one of these variants six to nine thus constitutes a hinge provided with at least two degrees of freedom to move in rotation and arranged between the floor and the bucket. Preferably, this third mechanical connection also includes a degree of freedom to move in translation along the fifth axis. By way of example, this fifth axis is parallel to the third axis of the second connection and to the longitudinal direction X of the seat.

For the second embodiment of the seat, this degree of freedom of the third mechanical connection to move in translation is not necessary and is compensated by at least one degree of freedom of the fourth connection to move in rotation.

For these nine variants, the two first legs may have various different configurations. The two first legs generate a V-shape, with the two first directions respectively interconnecting the two ends of each of the first legs not being parallel to each other. Consequently, this V-shape can be oriented with its apex pointing downwards, or on the contrary, with its apex pointing upwards.

In a first configuration, the two first legs generate a V-shape with the apex pointing downwards. The distance between the two first mechanical connections arranged between the second legs and the floor is considerably smaller than the distance between the first connections arranged between the second legs and the bucket. Furthermore, the two first mechanical connections are close to each other, thereby enhancing non-twisting of the bucket when the floor deforms.

Preferably, the two first legs are mechanically connected together at one of their ends, via the second mechanical connection so that the stand has a first interface with four connection points with the bucket and a second interface with three connection points with the floor.

In this first configuration, a tenth variant specific to this first configuration is possible. In this tenth variant, each first mechanical connection is provided with no degree of freedom and is formed by a permanent connection, whereas each second mechanical connection is provided with at least two degrees of freedom to move in rotation. Each second mechanical connection may for example have three degrees of freedom to move in rotation and be formed by a ball joint connection. The two first legs have no degree of freedom to move relative to each other.

Furthermore, each second mechanical connection may also have a degree of freedom to move in translation, preferably parallel to the transverse direction Y of the seat.

In a second configuration, the two first legs generate a V-shape with its apex pointing upwards. The distance between the two second mechanical connections between the second legs and the floor is considerably greater than the distance between the first connections between the second legs and the bucket. Furthermore, the two first mechanical connections are close to each other, thus serving to limit the stresses that are transmitted to the bucket during deformation of the floor, and consequently serving to enhance non-twisting of the bucket.

Preferably, the two first legs are mechanically connected together at one of their ends by the first mechanical connection, so that the stand has a first interface having three connection points with the bucket and a second interface having four connection points with the floor. The two first legs then have at least one degree of freedom to move in rotation relative to each other.

This second configuration advantageously makes it possible to have the bucket supported in statically determinate manner on the stand. Furthermore, the stand is supported on the floor via four points, thus enabling the seat to be fastened to a standard floor that conventionally has two rails extending parallel to the longitudinal axis of the vehicle.

In addition, whatever the variant, the two first legs may be identical in length, so that they are installed symmetrically. Nevertheless, it is also possible for the two first legs to be of different lengths.

Likewise, the second legs may be lengths that are identical, or else that are different.

Furthermore, the stand is generally fastened to a floor that is substantially horizontal. Nevertheless, in certain vehicles, the floor may rise over one or more side walls of the vehicle. Furthermore, the stand may also be fastened directly to a side wall of the vehicle. Under such circumstances, the side wall can be considered as being the floor in the context of the invention, the fastening point of the seat possessing analogous behavior. It is then possible for the two first legs to be of different lengths.

Finally, independently of these two embodiments, the first legs may be arranged at the front of the seat, the third mechanical connections, and for the second embodiment the second legs, then being arranged at the rear of the seat. These first legs may also be arranged at the rear of the seat, the third mechanical connections, and for the second embodiment the second legs, then being arranged at the front of the seat.

Installing the first legs at the front or at the rear of the seat does not significantly modify the behavior of the seat in the event of strong deceleration of the vehicle, and under all circumstances makes it possible to guarantee that there is no twisting of the bucket of the seat.

Furthermore, the stand of the seat of the invention may be sufficiently bendable to move in rotation about one or more axes, such bending then constituting a mechanical connection provided with one or more degrees of freedom to move in rotation. Such bending ability may be used in particular for the legs of the stand.

In addition, the mechanical connections of the stand may incorporate friction, the friction imposing some minimum level of force in order to cause the mechanical connection to move. The friction makes it possible to avoid flexibility or small movements of the seat at the slightest movement of the passenger occupying the seat. In contrast, as soon as that minimum level of force is applied to the mechanical connection, e.g. as a result of the floor deforming and/or as a result of strong deceleration of the seat, the mechanical connection behaves like a mechanical connection that is free, i.e. without friction.

Such friction is necessary in particular for any cylindrical joints that may be included in the stand of the seat, in order to avoid incessant movements of the seat. Furthermore, each cylindrical joint also includes abutments limiting the amplitude of its movements in translation.

The bucket of the seat of the invention, which includes the pan and the back, may be made of composite materials, e.g. glass or carbon fibers and epoxy resin. The use of composite materials serves advantageously to reduce the weight of the bucket. The bucket may also include components made of metal and/or of plastics material.

The first and second legs may be made of metal, e.g. of aluminum, or indeed of composite materials, e.g. from "resin" extruded sections.

In addition, the seat generally includes a retaining system, e.g. constituted by a seat belt or indeed a harness. The retaining system serves to hold the passenger securely to the seat. The absence of the bucket twisting serves advantageously to preserve the initial shape of the bucket, thereby guaranteeing that the passenger is held in a correct position on the pan and the back of the seat, without excessive asymmetry or sliding, and also relative to the retaining system.

Consequently, the forces exerted by the retaining system on the passenger during strong deceleration are applied to the intended zones of the passenger's body, thereby avoiding giving rise to additional bodily injuries. Holding the passenger in a correct position in this way also serves to limit the additional mechanical stresses generated by the passenger on the bucket and on the stand of the seat, thus limiting the risk of the seat breaking.

Furthermore, an aircraft seat generally includes at least one energy absorber device so as to dissipate energy in the event of an accident or of the aircraft landing violently. Such a device, e.g. as described in Document FR 2 930 613, is arranged between the pan and the bucket of the seat. The seat may also include at least one fuse means connecting the pan to the bucket. By way of example, each fuse means may be formed by a strap that is designed to break in the event of strong deceleration of the vehicle so as to allow the energy absorber device to deploy and dissipate a portion of the energy stored by the passenger of the seat.

The seat of the invention then has a fifth mechanical connection having one degree of freedom to move in rotation about a ninth axis between the pan and the bucket. The pan is then connected to the bucket firstly by each energy absorber device and secondly by the fifth mechanical connection so as to dissipate a portion of the energy during an accident of the vehicle. The fifth mechanical connection is typically a revolute joint about the ninth axis.

Thus, during strong deceleration of the vehicle, the forces generated by the passenger present on the pan are transmitted to the bucket by the fusible means and by the fifth mechanical connection. When a sufficient level of deceleration is reached, the strap breaks, each of the energy absorber devices deploys, and the pan tilts about the first axis of the fifth mechanical connection. The downward movement of the pan is then slowed by means of each energy absorber device.

Preferably, the pan is connected to the bucket by the fifth mechanical connection arranged at the nose of the pan, i.e. the front portion of the pan, and the ninth axis is preferably parallel to the transverse direction Y of the seat, when the seat is installed in the vehicle in the longitudinal direction of the vehicle.

The absence of twisting of the bucket as a result of the vehicle floor deforming limits or even eliminates the appearance of static mechanical stresses at the components of the seat. Consequently, the risk of each energy absorber device malfunctioning is advantageously reduced or even eliminated, where such malfunctioning may comprise random operation of each energy absorber device, or sudden variations in energy absorption, or indeed absence of deployment. Advantageously, the capacity of the seat of the invention to absorb energy is thus independent of whether or not the vehicle floor is deformed.

Furthermore, the appearance of friction between the guide means that the seat may include between the bucket and the stand is also reduced or even eliminated, thereby avoiding generating phenomena of catching, of jerky sliding, or of total blocking of such guide means.

Finally, the absence of the bucket twisting avoids the need to overdimension components of the seat as is generally necessary for accommodating such deformation of the floor. Consequently, since the bucket is no longer directly subjected to mechanical stresses associated with the floor deforming, it can be entirely rigid. Furthermore, the stand can be simplified, using mechanical components that are simpler, that require less manufacturing accuracy, and that are smaller in number. This simplification of the stand thus intrinsically improves the reliability of the seat, significantly reduces the cost of fabricating it, and also reduces the weight of the seat.

Furthermore, this behavior of the seat of the invention during strong deceleration of the vehicle is independent of the position or the orientation of the seat in the vehicle, and consequently of the way in which deformation of the floor is applied to the seat.

Furthermore, the aircraft seat of the invention behaves in analogous manner during a crash regardless of whether or not the floor is deformed, whereas the validation testing of a seat as required by aviation regulations imposes deformation of the floor of the aircraft.

The bucket of the seat of the invention may be replaced by a plate, e.g. formed by a turntable. The stand then provides the interface between the floor of the vehicle and the plate. Under such circumstances, the invention provides a support installed in a vehicle and on which it is possible to install various pieces of equipment.

Such a plate may be used, by way of example, as an interface for other types of seats that already exist.

BRIEF DESCRIPTION OF THE DRAWINGS

The invention and its advantages appear in greater detail from the context of the following description of embodiments given by way of illustration and with reference to the accompanying figures, in which:

FIGS. 9 to 15 show two embodiments of a seat of the invention; and

Elements present in more than one of the figures are given the same references in each of them.

DETAILED DESCRIPTION OF THE INVENTION

Figure 6:
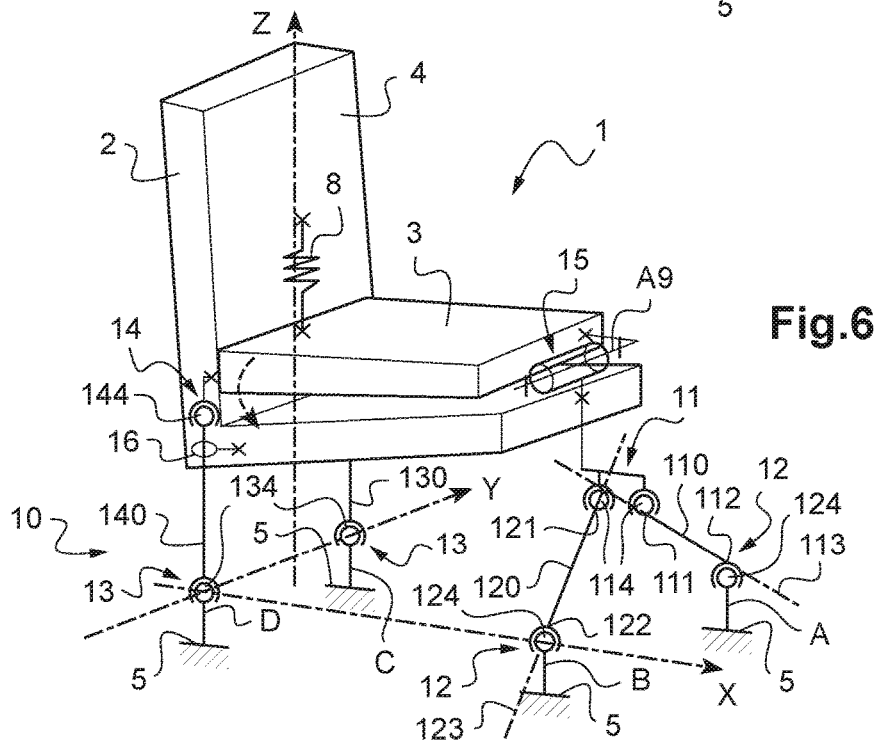
Figure 7:
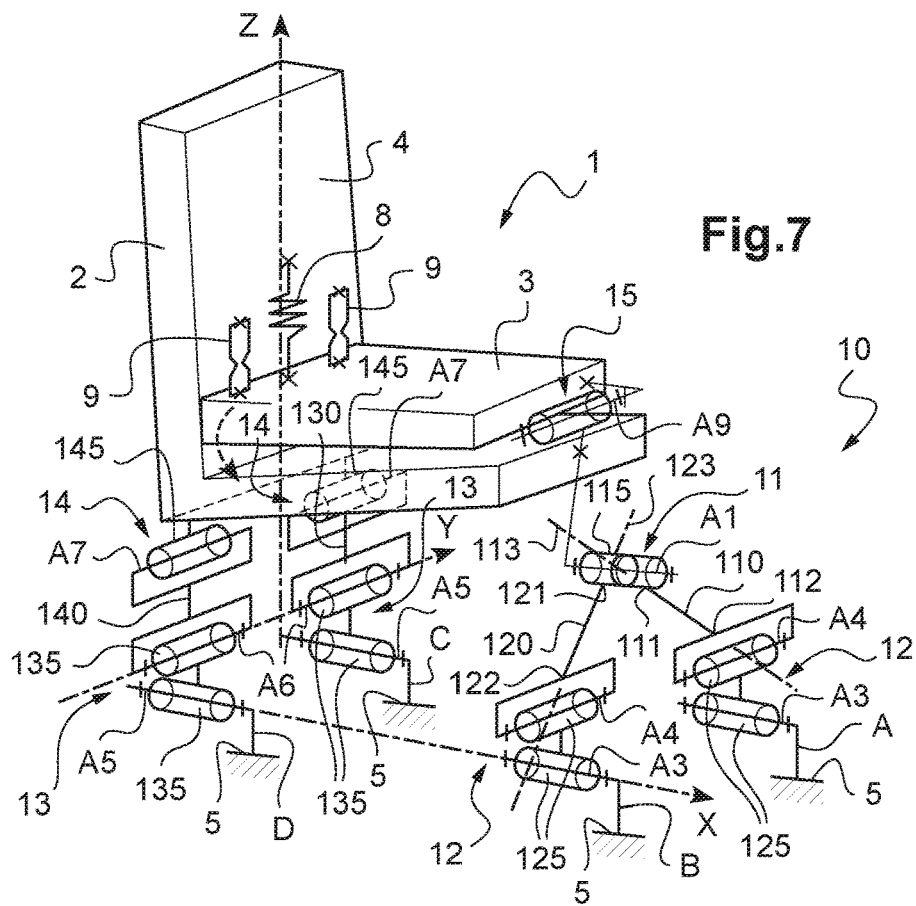
Figure 8:
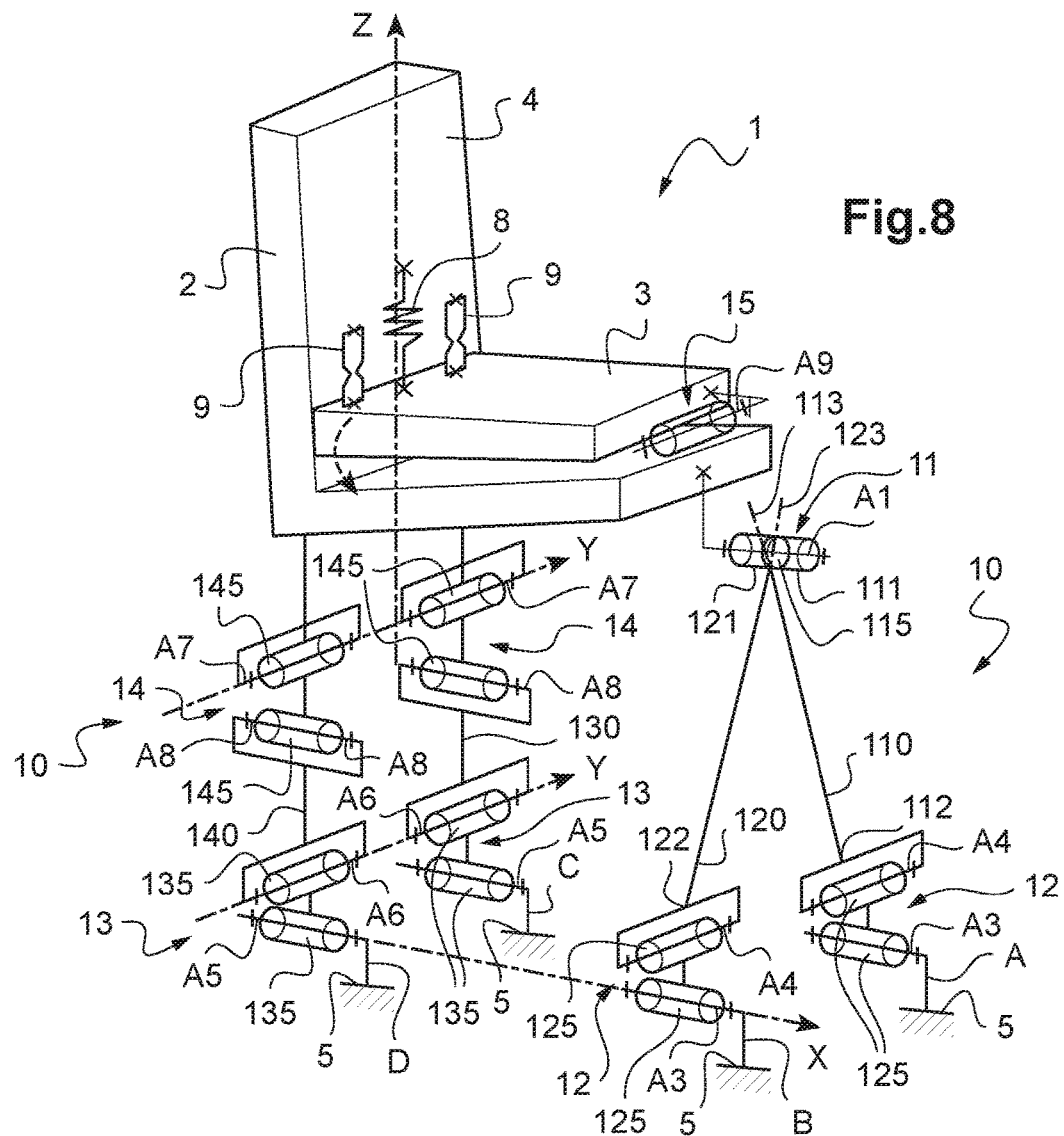

FIGS. 1 to 5 are five theoretical diagrams showing different variants of a seat 1 in a first embodiment of the invention. FIGS. 6 to 8 are three theoretical diagrams showing three variants of a seat 1 in a second embodiment of the invention. These theoretical diagrams show the various movable connections of the seat 1 of the invention.

In a manner that is common to each of the embodiments, the seat 1 comprises a stand 10 and a bucket 2 having both a seat pan 3 and a seat back 4. The seat 1 also has a retaining system (not shown) and an energy absorber device 8.

Such a seat 1 is for installing inside a vehicle, and in particular inside an aircraft cabin. The stand 10 serves to fasten the bucket 2 to a floor 5 of the vehicle. The floor 5 of an aircraft also has rails 51, 52 in which the stand 10 is fastened via three or four fastening points A, B, C, and D. In general, these rails 51, 52 are arranged longitudinally in the vehicle, but they could also be installed differently, e.g. transversely.

An X, Y, Z rectangular reference frame is associated with each seat 1. A longitudinal direction X extends from the rear of the seat 1 towards the front of the seat 1, i.e. from the back 4 towards the nose of the pan 3, and a transverse direction Y extends from one flank of the pan 3 to the other flank of the pan 3 perpendicularly to the longitudinal direction X. An elevation direction Z extends upwards, i.e. from the floor 5 towards the pan 3. The back 4 is connected to the pan 3 along a directly that is substantially parallel to the transverse direction Y.

In general, the seat 1 is installed on the travel axis of the vehicle, so the longitudinal and transverse directions X and Y of the seat 1 correspond to the longitudinal and transverse directions of the vehicle. The seat 1 may be installed in the forward direction of the vehicle, i.e. "facing forwards", or in the opposite direction to the forward direction of the vehicle, i.e. "facing backwards". Nevertheless, it is equally possible for the seat 1 to be installed in any other way in the vehicle.

The pan 3 is connected to the bucket 2 via the energy absorber device 8 and by a fifth mechanical connection 15 formed by a revolute joint about a ninth axis A9 parallel to the transverse direction Y. Thus, during strong vertical deceleration of the seat 1, e.g. as a result of a violent impact or of an accident of the vehicle, the energy absorber device 8 deploys to dissipate at least a portion of the energy due to such deceleration, and the pan 3 pivots about the ninth axis A9 via the fifth mechanical connection 15.

Furthermore, in the variants shown in FIGS. 2, 3, 7, and 8, the seat 1 also has fuse means 9 connecting the pan 3 to the bucket 2. These fuse means 9 avoid the energy absorber device 8 being stressed permanently, with the fuse means 9 providing the normal connection between the pan 3 and the bucket 2. In the event of strong stress as a result of strong vertical deceleration of the seat 1, the fuse means 9 break, thereby enabling the energy absorber device 8 to be deployed.

The stand 10 of the seat 1 in both embodiments also comprises two first legs 110 and 120 and mechanical connections 11, 12, and 13. Each first leg 110, 120 is provided with two ends 111, 121, 112, 122 and is mechanically connected firstly at a first end 111, 121 to the bucket 2 via a respective first mechanical connection 11, and secondly at a second end 112, 122 to the floor 5 via a respective second mechanical connection 12.

Figure 3:
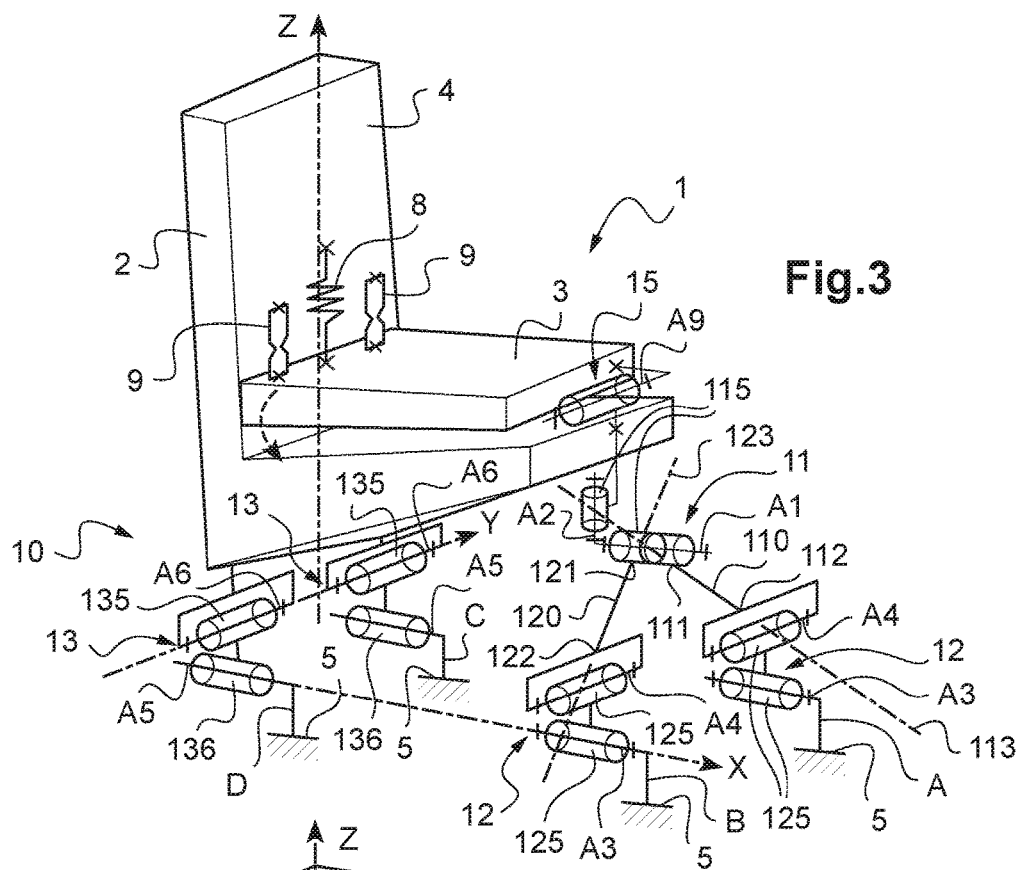
Figure 4:
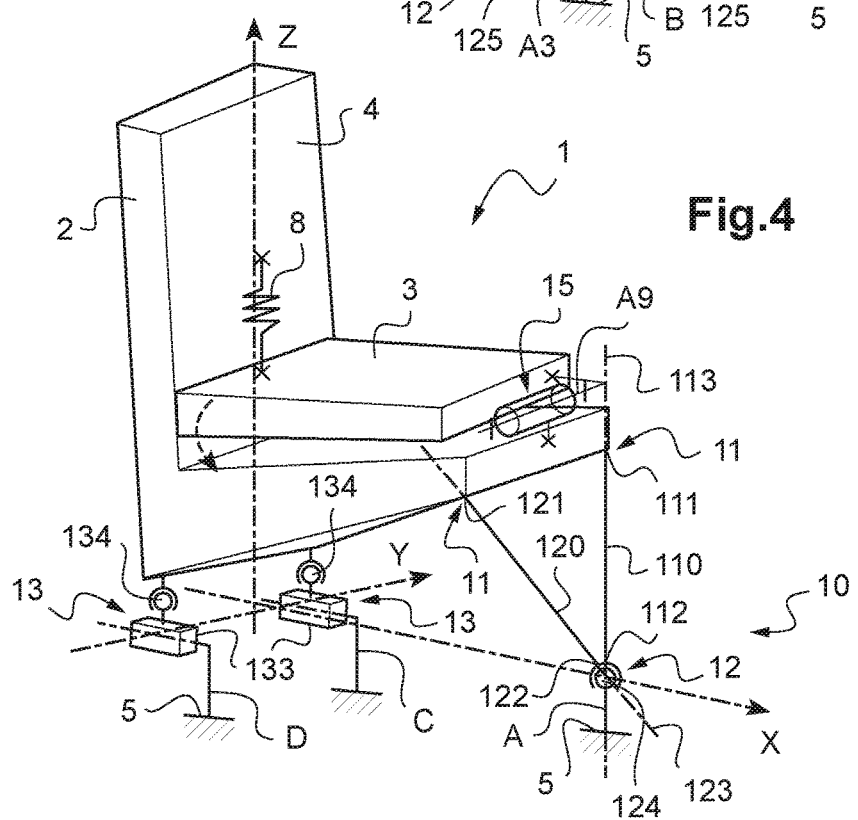
Figure 5:
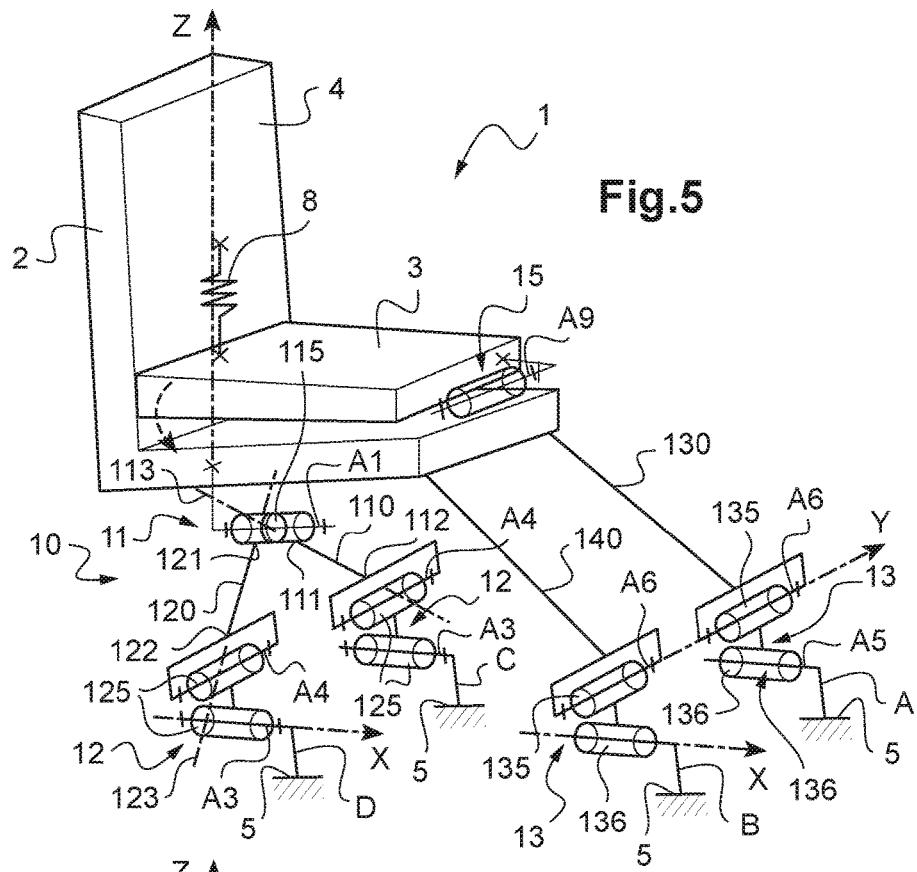

The two first legs 110 and 120 are arranged at the front of the seat 1 in the longitudinal direction X in the theoretical diagrams of FIGS. 1 to 4, whereas the two first legs 110 and 120 are arranged at the rear of the seat 1 in the longitudinal direction X in the theoretical diagram of FIG. 5. Furthermore, each first leg is straight and arranged in a first direction 113, 123 extending between its two ends 111, 121 or 112, 122. The two first directions 113, 123 formed by the two first legs 110, 120 are not parallel to each other, and they form a V-shape.

Two third mechanical connections 13 also connect the bucket 2 mechanically to the floor 5 at the rear of the seat 1.

In the first embodiment, the bucket 2 is connected to the floor 5 directly by the third mechanical connections 13. Each third bucket connection 13 constitutes a hinge between the bucket 2 and the floor 5.

Figure 1:
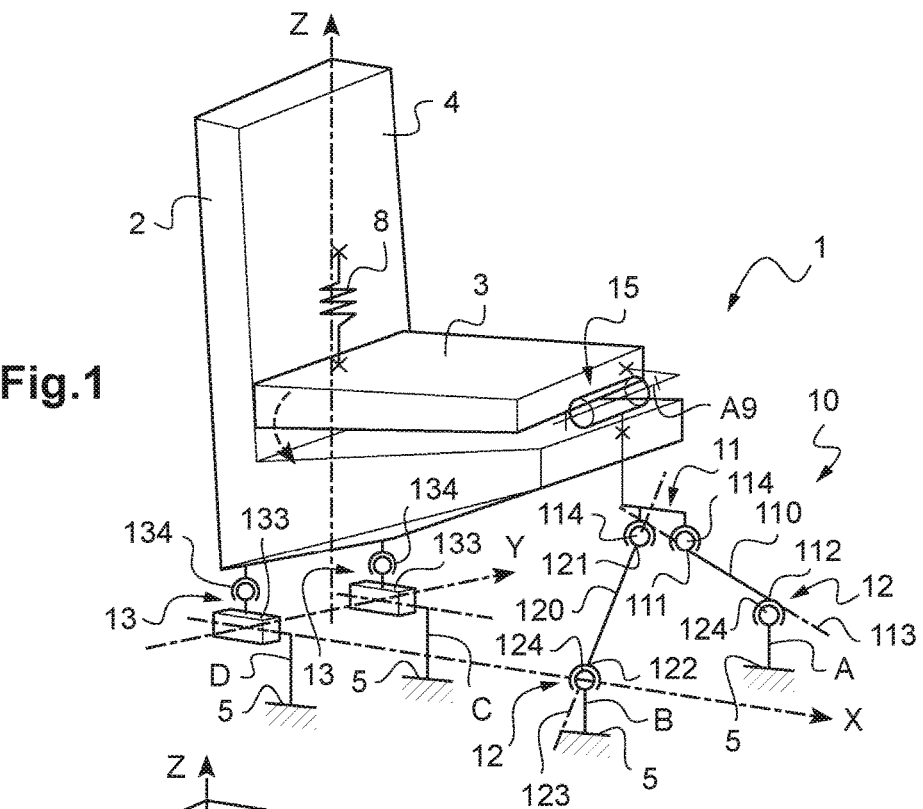
FIGS. 1 to 8 are theoretical diagrams of seats of the invention.

In the variant of this seat 1 constituting the first embodiment as shown in FIG. 1, each first leg 110, 120 is connected firstly to the floor 5 via a ball joint connection 124 constituting the second mechanical connection 12, and secondly to the bucket 2 by a ball joint connection 114 constituting the first mechanical connection 11. As a result, the two first legs 110 and 120 are connected to the floor 5 at two front fastening points A and B. The two first legs 110 and 120 are thus movable relative to each other in rotation. The bucket 2 is also connected to the floor 5 by two hinges formed respectively by a ball joint connection 134 and by a prismatic joint 133 in the longitudinal direction X and constituting the third mechanical connections 13 at two rear fastening points C and D. In addition, the V-shape of the two first directions 113 and 123 has its apex pointing upwards, i.e. towards the pan 3.

When the floor 5 deforms, the fastening points A, B, C, and D move relative to one another. In particular, the fastening points A and B may move relative to each other, thereby causing one of the first legs 110, 120 to move relative to the other first leg 110, 120, while varying the angle formed between them. This movement of one first leg 110, 120 relative to the other is made possible by the ball joint connections 114 and 124. Deformation of the floor 5 between the fastening points A and B can be compensated by the movement of the first legs 110 and 120.

These movements of the first legs 110 and 120 cause the bucket 2 to tilt as a whole because of the ball joint connections 114, 124, and 134 and because of the prismatic joint 133 between the bucket 2 and the floor 5 at the fastening points C and D.

Likewise, movement of the rear fastening points C and D relative to each other or indeed relative to the front fastening points A and B, as a result of the floor 5 deforming, is compensated in analogous manner because of the various ball joint connections 114, 124, and 134, and because of the prismatic joint 133 of the stand 10 of the seat 1. Consequently, the bucket 2 shifts and/or tilts without twisting.

In addition, the bucket 2 presenting flexibility at the ball joint connections 124, 134 with the floor 5 can also contribute to absence of twisting by compensating for the deformation of the floor 5.

Advantageously, using a statically determinate interface between the stand 10 and the bucket 2 also contributes to not transferring deformation from the floor 5 to the bucket 2.

Figure 2:
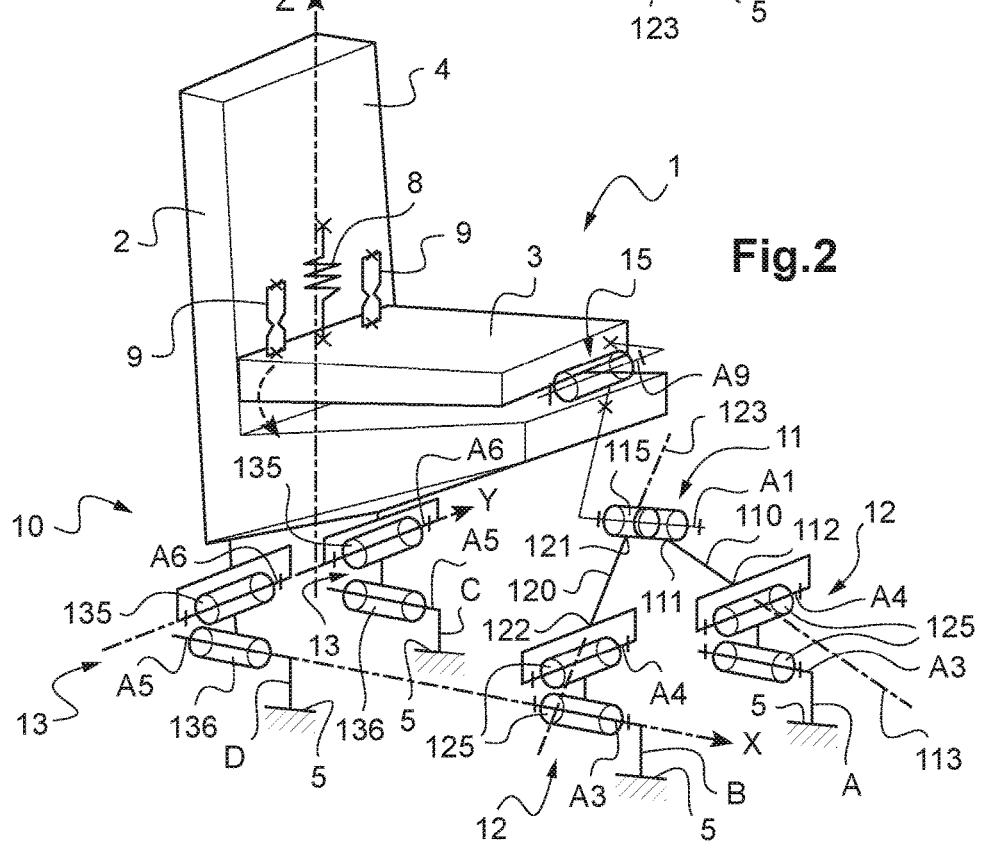

For the variant of the seat 1 in this first embodiment that is shown in FIG. 2, each first leg 110 and 120 is connected firstly to the floor 5 via two revolute joints 125 constituting the second mechanical connection 12, and secondly to the bucket 2 via two revolute joints 115 on a common axis constituting the first mechanical connection 11. As a result, the two first legs 110 and 120 are connected to the floor 5 at two front fastening points A and B. Furthermore, the two first legs 110 and 120 are connected to each other via revolute joints 115 and are thus movable relative to each other in rotation. The bucket 2 is also connected to the floor 5 via a cylindrical joint 136 and a revolute joint 135 constituting the third mechanical connection 13 at two rear fastening points C and D. As above, the V-shape of the first two directions 113 and 123 has its apex pointing upwards, i.e. towards the pan 3.

The two revolute joints 115 are about a first axis A1, the first axis A1 being parallel to the longitudinal direction X. The cylindrical joints 125 are about third and fourth axes A3 and A4 that are not parallel to each other, the third axis A3 being parallel to the longitudinal direction X and the fourth axis A4 being parallel to the transverse direction Y.

The cylindrical joint 136 is on a fifth axis A5 and the revolute joint 135 is about a sixth axis A6, the fifth axis A5 being parallel to the longitudinal direction X and the sixth axis A6 being parallel to the transverse direction Y.

The connection between the two first legs 110 and 120 via the revolute joints 115 serves advantageously to enable the stand 10 to have a first statically determinate interface having three connection points with the bucket 2, and a second interface having four connection points with the floor 5.

The behavior of this variant of the seat 1 is substantially identical to the behavior of the variant shown in FIG. 1. Specifically, replacing the ball joint connections with a cylindrical joint and with a revolute joint does not remove any degree of freedom and does not put such behavior into question.

In particular, by compensating for deformation of the floor 5, the cylindrical joints 125 and 135 with the floor 5 contribute to there being no twisting.

Furthermore, each cylindrical joint 126 and 136 and each prismatic joint 133 includes friction and abutments serving firstly to prevent unwanted movements of the stand 10, and secondly to limit the amplitude of such movements in translation in the event of the floor 5 deforming or indeed in the event of the seat 1 being subjected to strong deceleration.

The variant of the seat 1 in this first embodiment that is shown in FIG. 3 is very close to the variant shown in FIG. 2. The difference lies in the first connection 11, which includes an additional revolute joint 115 about a second axis A2 parallel to the vertical direction Z.

The additional revolute joint 115 between the two first legs 110 and 120 and the bucket 2 serves advantageously to add a degree of freedom between the bucket 2 and the floor 5. The behavior of this variant of the seat 1 is thus substantially improved compared with the behavior of the variant shown in FIG. 2 in the event of the aircraft that includes the seat 1 crashing and the floor 5 deforming as a result.

For the variant of the seat 1 in this first embodiment that is shown in FIG. 4, each first leg 110 and 120 is connected firstly to the floor 5 via a common ball joint connection 124 constituting the second mechanical connection 12, and secondly to the bucket 2 via a permanent connection 11 constituting the first mechanical connection 11. As a result, the first two legs 110 and 120 are connected to the floor 5 at a single front fastening point A. The two first legs 110 and 120 are thus stationary relative to each other and also stationary relative to the pan 3. The bucket 2 is also connected to the floor 5 via two hinges formed respectively by a ball joint connection 134 and by a prismatic joint 133 along the longitudinal direction X and constituting the third mechanical connection 13 at the rear fastening points C and D. In addition, the V-shape of the first two directions 113 and 123 has its apex pointing downwards, i.e. towards the floor 5.

The connection between the two first legs 110 and 120 via the ball joint connection 124 serves advantageously to enable the stand 10 to have a first interface with the bucket 2 via four connection points and to have a statically determinate second interface with the floor 5 via three connection points.

The use of a single fastening point A at the front of the seat 1 serves to avoid one of the fastening points moving relative to the other as happens for the seats 1 shown in FIGS. 1 to 3 with the front fastening points A and B. Consequently, the use of a single ball joint connection 124 makes it possible to absorb movements of this front fastening point A when the floor 5 deforms, thereby eliminating any degree of freedom to move between either of the first legs 110, 120 and the bucket 2, and secondly between the first legs 110, 120 relative to each other.

Furthermore, the ball joint connections 134 and the prismatic joint 133 connecting the bucket 2 to the floor 5 via rear fastening points C and D are sufficient for compensating the deformation of the floor 5 and the movements of these rear fastening points C and D that can be generated thereby.

As a result, as for the variants of the seat 1 shown in FIGS. 1 to 3, the bucket 2 in the variant of the seat 1 shown in FIG. 4 can shift and/or tilt during deformation of the floor 5, without twisting.

The variant of the seat 1 in this first embodiment that is shown in FIG. 5 has first legs 110 and 120 and first, second, and third mechanical connections 11, 12, and 13 that are identical to the variant shown in FIG. 2. The differences between these two variants lie in the arrangement of the first legs 110 and 120 and of these mechanical connections 11, 12, and 13 between the seat 1 and the floor 5. For this variant that is shown in FIG. 5, the first legs 110 and 120 and the first and second mechanical connections 11 and 12 are arranged at the rear of the seat 1 in the longitudinal direction X, whereas each third mechanical connection 13 is arranged at the front of the seat 1. Second legs 130 and 140 enable each third mechanical connection 13 to be connected to the bucket 2 of the seat 1. These second legs 130 and 140 have no degree of freedom to move relative to the bucket 2.

As a result, in a manner similar to the variant shown in FIG. 2, the stand 10 has a statically determinate first interface comprising three connection points with the bucket 2, and a second interface with four connection points with the floor 5. The behavior of this variant of the seat 1 is thus substantially identical to the behavior of the variant shown in FIG. 2.

For the second embodiment as shown in FIGS. 6 to 8, the bucket 2 is connected to the floor 5 via two second legs 130 and 140, and via third and fourth mechanical connections 13 and 14.

In addition to the elements of the first embodiment, the stand 10 thus includes two second legs 130 and 140 and two fourth mechanical connections 14. Each second leg 130, 140 connects the bucket 2 to a third mechanical connection 13, each fourth mechanical connection 14 connecting a second leg 130, 140 to the bucket 2.

For the variant of the seat 1 in this second embodiment that is shown in FIG. 6, each first leg 110, 120 is connected as in the variant of the seat shown in FIG. 1, firstly to the floor 5 via a ball joint connection 124 constituting the second mechanical connection 12, and secondly to the bucket 2 via a ball joint connection 114 constituting the first mechanical connection 11. As a result, the first two legs 110 and 120 are connected to the floor 5 at two front fastening points A and B. The two first legs 110 and 120 are thus movable relative to each other in rotation. Likewise, the V-shape of the first two directions 113 and 123 has its apex pointing upwards, i.e. towards the pan 3. Furthermore, each second leg 130, 140 is connected to the floor 5 via two respective ball joint connections 134 constituting the third mechanical connections 13 at two rear fastening points C and D.

Each fourth mechanical connection 14 is a ball joint connection 144 and includes a blocking element 16 constituting a friction element that generates friction within the ball joint connection and prevents this fourth mechanical connection 14 moving freely. Consequently, a second leg 130, 140 can move in rotation relative to the bucket 2 only from a predetermined force.

Figure 16:
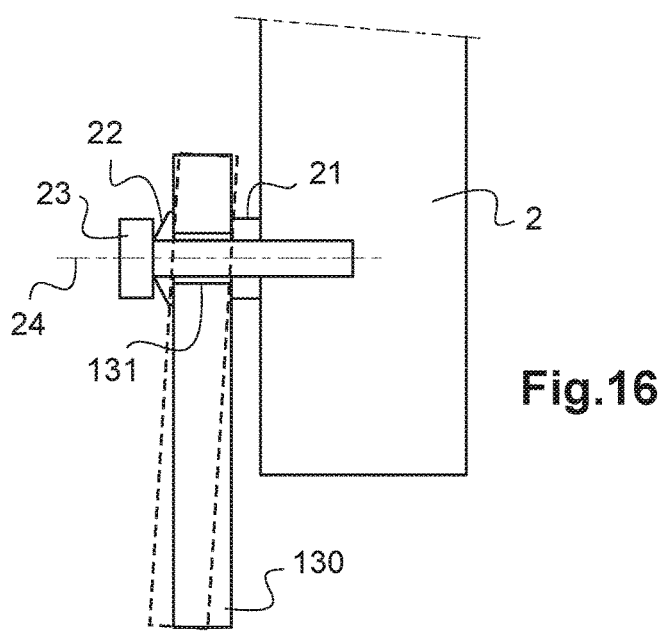
FIG. 16 is a detail view of a fourth mechanical connection of the seat.

An embodiment of such a fourth mechanical connection 14 is shown in FIG. 16. This fourth mechanical connection 14 is formed by a spacer 21, a flexible washer 22, and a cylindrical peg 23 having an axis 24. The peg 23 is secured to the bucket 2 and is arranged in a hole 131 in the second leg 130. The flexible washer 22 enables the predetermined force to be applied to the second leg 130, which holds the second leg 130 stationary relative to the bucket 2. Consequently, when the second leg 130 is subjected to a force greater than this predetermined force, the second leg 130 can move in rotation about an axis perpendicular to the axis 24 of the peg 23. Furthermore, the second leg 130 may also move about the axis 24.

For the variant of the seat 1 in this second embodiment as shown in FIG. 7, each first leg 110, 120 is connected firstly to the floor 5 via two revolute joints 125 constituting the second mechanical connection 12, and secondly to the bucket 2 via two revolute joints 115 on a common axis constituting the first mechanical connection 11. As a result, the two first legs 110 and 120 are connected to the floor 5 at two front fastening points A and B. Furthermore, the two first legs 110 and 120 are connected together via the revolute joints 115 and are thus movable relative to each other in rotation. As above, the V-shape of the two first directions 113 and 123 has its apex pointing upwards, i.e. towards the pan 3.

The revolute joints 115 are about a first axis A1 that is parallel to the longitudinal direction X. The two revolute joints 125 are about third and fourth axes A3 and A4, the third axis A3 being parallel to the longitudinal direction X and the fourth axis A5 being parallel to the transverse direction Y.

The bucket 2 is connected to the floor 5 at two rear fastening points C and D via two second legs 130 and 140 and two revolute joints 135 constituting the third mechanical connections 13. The two revolute joints 135 are about fifth and sixth axes A5 and A6, the fifth axis A5 being parallel to the longitudinal direction X, and the sixth axis A6 being parallel to the transverse direction Y.

The second legs 130 and 140 are connected to the bucket 2 via respective revolute joints 145 constituting each of the fourth mechanical connections 14. Each pivot connection 145 is about a seventh axis parallel to the transverse direction Y.

The connection between the two first legs 110 and 120 at a revolute joint 115 serves advantageously to enable the stand 10 to have a statically determinate first interface with the bucket 2 via three connection points, and a second interface with the floor 5 via four connection points.

The variant of the seat 1 in this second embodiment as shown in FIG. 8 is very close to the variant shown in FIG. 7. The difference lies in the fourth connection 14, which includes an additional revolute joint 145 about an eighth axis A8 parallel to the longitudinal direction X.

The behavior of these two variants of the seat 1 is substantially identical to the behavior of the variant shown in FIG. 6. Specifically, replacing the ball joint connections by revolute joints eliminates one degree of freedom, but without putting this behavior into question.

Furthermore, the behavior of the variants of the seat 1 in this second embodiment as shown in FIGS. 6 to 8 is substantially identical to the behavior of the variants of the seat 1 in the first embodiment as shown in FIGS. 1 to 5 in the event of the floor 5 deforming. The stand 10 of such a seat 1 thus makes it possible to absorb deformation of the floor 5 while limiting the mechanical stresses that are transmitted to the bucket 2 of the seat 1 and while avoiding twisting or deformation of the bucket 2.

Examples of a seat 1 in each embodiment are shown in FIGS. 9 to 15 respectively.

Examples of a seat 1 of the first embodiment are shown in FIGS. 9 to 11, and of the second embodiment in FIGS. 12 to 15.

For the first embodiment, the bucket 2 of the seat 1 is made up of two structural "boomerangs" 21 and 22 together with a top cross-bar 23, a bottom cross-bar 24, and a front cross-bar 25 connecting together the two boomerangs 21 and 22. A pan 3 and a back 4 are fastened to the bucket 2.

Each boomerang 21, 22 is fastened to a rail 51, 52 of the floor 5 via a third mechanical connection 13 such a ball joint connection. The front cross-bar 25 is connected to each rail 51, 52 of the floor 5 via two first legs 110, 120. Each first leg 110, 120 is connected firstly to a rail 51, 52 of the floor 5 via a second mechanical connection 12 such a ball joint connection, and secondly to the front cross-bar 25 via a first mechanical connection 11 such a ball joint connection. The stand 10 of this seat 1 is formed by the two first legs 110 and 120, and the mechanical connections 11, 12, and 13.

The boomerangs 21, 22, the cross-bars 23, 24, and 25, and the first legs 110 and 120 may be made out of aluminum, for example, while the pan 3 and the back 4 may be made out of composite materials.

For the second embodiment, the bucket 2 of the seat 1 is a single piece, e.g. being made of composite materials. The bucket 2 incorporates the pan 3 and the back 4. The bucket 2 is fastened to the rails 51 and 52 of the floor 5 via first legs 110 and 120 and second legs 130 and 140.

Each first leg 110, 120 is connected firstly to a rail 51, 52 of the floor 5 via a second mechanical connection 12 such a ball joint connection and secondly to the bucket 2 via a first mechanical connection 11 such a ball joint connection. Each second leg 130, 140 is connected firstly to a rail 51, 52 of the floor 5 via a third mechanical connection 13 such a ball joint connection, and secondly to the bucket 2 via a fourth mechanical connection 14 such a ball joint connection. As a result, the stand 10 of this seat 1 is made up of the two first legs 110 and 120, the two second legs 130, 140, and the mechanical connections 11, 12, 13, and 14. By way of example, the first and second legs 110, 120, 130, and 140 may be made of aluminum.

For both of these embodiments, the seat 1 shown in FIGS. 9 to 15 has a plane of symmetry P1. This plane of symmetry P1 is parallel to a plane formed by the longitudinal and vertical directions X and Z of the seat 1. In particular, the stand 10 is thus symmetrical about this plane of symmetry P1.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

In particular, the two first legs 110 and 120 are arranged at the front of the seat 1 in most of the theoretical diagrams and in the examples shown in the figures, while the third mechanical connections 13, and the second legs 130 and 140, if any, are arranged at the rear of the seat 1. Nevertheless, this configuration could be inverted as shown in FIG. 5 for all of the variants that are described, it being possible for the two first legs 110 and 120 to be arranged at the rear of the seat 1 while the third mechanical connections 13, and the second legs 130 and 140, if any, can be arranged at the front of the seat 1.

What is claimed is:

1. A vehicle seat comprising a bucket and a stand, the bucket having a seat pan and a seat back, the stand being designed to fasten the bucket to a floor of the vehicle, wherein the stand has two first legs and mechanical connections, each first leg being provided with two ends and being mechanically connected firstly via one of the two ends to the bucket via a first mechanical connection having no degree of freedom to move in translation, and secondly being designed to be mechanically connected via another one of the two ends to the floor via a second mechanical connection having at least two degrees of freedom in movement and only degrees of freedom to move in rotation, two first directions respectively interconnecting the two ends of each of the first legs not being mutually parallel, two third mechanical connections respectively having at least two degrees of freedom to move in rotation being designed for mechanically connecting the bucket to the floor in order to enable the stand to absorb deformation of the floor, while limiting the mechanical stresses that are transmitted to the bucket, and avoiding twisting of the bucket.

2. A seat according to claim 1, wherein the two first legs are mechanically connected together at one of the two ends at the first mechanical connection so that the stand has a first interface comprising three connection points with the bucket and a second interface comprising four connection points with the floor, the two first legs having at least one degree of freedom to move in rotation relative to each other, each first mechanical connection being provided with at least one degree of freedom to move in rotation.

3. A seat according to claim 1, wherein the two first legs are mechanically connected together at a first one of the two ends at the second mechanical connection so that the stand has a first interface comprising four connection points with the bucket and a second interface comprising three connection points with the floor.

4. A seat according to claim 3, wherein each first mechanical connection has no degree of freedom to move and is formed by a permanent connection, the two first legs having no degree of freedom to move relative to each other.

5. A seat according to claim 1, wherein each first mechanical connection and each second mechanical connection is provided with three degrees of freedom to move in rotation and is formed by a respective ball joint connection.

6. A seat according to claim 1, wherein each first mechanical connection is provided with one degree of freedom to move in rotation about a first axis, and each second mechanical connection is provided with two degrees of freedom to move in rotation about third and fourth axes that are not mutually parallel, the first axis being parallel to one of the third and fourth axes.

7. A seat according to claim 6, wherein each first mechanical connection is provided with a second degree of freedom to move in rotation about a second axis that is not parallel to the first axis.

8. A seat according to claim 6, wherein each first mechanical connection, or indeed each second mechanical connection, is provided with a third degree of freedom to move in rotation.

9. A seat according to claim 6, wherein for longitudinal, transverse, and vertical directions X, Y, and Z forming a rectangular reference frame attached to the seat, the longitudinal direction X extending from the rear of the seat towards the front of the seat, the transverse direction Y extending from one flank of the pan towards another flank of the pan, and the vertical direction Z extending from the floor towards the pan, the first and third axes are parallel to the longitudinal direction X, the fourth axis is parallel to the transverse direction Y, and when each first mechanical connection is provided with a second degree of freedom to move in rotation about a second axis, the second axis is parallel to the vertical direction Z.

10. A seat according to claim 6, wherein for longitudinal, transverse, and vertical directions X, Y, and Z forming a rectangular reference frame attached to the seat, the longitudinal direction X extending from the rear of the seat towards the front of the seat, the transverse direction Y extending from one flank of the pan towards another flank of the pan, and the vertical direction Z extending from the floor towards the pan, the first and third axes are parallel to the longitudinal direction X, the fourth axis is parallel to the transverse direction Y, and when each first mechanical connection is provided with a second degree of freedom to move in rotation about a second axis, the second axis is parallel to the transverse direction Y.

11. A seat according to claim 1, wherein each third mechanical connection is provided with two degrees of freedom to move in rotation about fifth and sixth axes that are not parallel to each other.

12. A seat according to claim 11, wherein each third mechanical connection is provided with a third degree of freedom to move in rotation.

13. A seat according to claim 11, wherein each second mechanical connection is provided with two degrees of freedom to move in rotation about third and fourth axes that are not parallel to each other, the fifth axis is parallel to the third axis, and the sixth axis is parallel to the fourth axis.

14. A seat according to claim 11, wherein each third mechanical connection is provided with a degree of freedom to move in translation along the fifth axis.

15. A seat according to claim 11, wherein the stand has second legs and fourth mechanical connections, each provided with at least one degree of freedom to move in rotation, each second leg connecting the bucket to a third mechanical connection, each fourth mechanical connection connecting a second leg to the bucket.

16. A seat according to claim 15, wherein each fourth mechanical connection is provided with one degree of freedom to move in rotation about a seventh axis and is formed by a revolute joint.

17. A seat according to claim 16, wherein each fourth mechanical connection is provided with two degrees of freedom to move in rotation about seventh and eighth axes that are not parallel to each other and that are formed by two revolute joints.

18. A seat according to claim 16, wherein each third mechanical connection is provided with two degrees of freedom to move in rotation about fifth and sixth axes, the seventh axis is parallel to the sixth axis, and when each fourth mechanical connection is provided with two degrees of freedom to move in rotation about seventh and eighth axes, the eighth axis is parallel to the fifth axis.

19. A seat according to claim 16, wherein each fourth mechanical connection includes at least one blocking element constituting an abutment limiting the movement in rotation of a second leg.

20. A seat according to claim 16, wherein each fourth mechanical connection includes at least one blocking element constituting a friction element generating friction within the fourth mechanical connection.

21. A seat according to claim 1, wherein two first legs are arranged at the front of the seat.

22. A seat according to claim 1, wherein two first legs are arranged at the rear of the seat.

23. A seat according to claim 1, wherein the seat includes at least one energy absorber device and a fifth mechanical connection about a ninth axis, the pan being connected to the bucket firstly by each energy absorber device and secondly by the fifth mechanical connection in order to dissipate energy during an accident of the vehicle.

* * * * *